(12) United States Patent
Yukami (10) Patent No.: US 12,049,108 B2
(45) Date of Patent: Jul. 30, 2024

(54) PNEUMATIC TIRE

(71) Applicant: Sumitomo Rubber Industries, Ltd., Kobe (JP)

(72) Inventor: Shinsuke Yukami, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/101,697

(22) Filed: Jan. 26, 2023

(65) Prior Publication Data

US 2023/0256777 A1 Aug. 17, 2023

(30) Foreign Application Priority Data

Feb. 17, 2022 (JP) ................................ 2022-023104

(51) Int. Cl.
*B60C 13/02* (2006.01)
*B60C 11/01* (2006.01)

(52) U.S. Cl.
CPC .............. *B60C 11/01* (2013.01); *B60C 13/02* (2013.01); *B60C 2200/14* (2013.01)

(58) Field of Classification Search
CPC ........ B60C 13/02; B60C 11/01; B60C 13/001
See application file for complete search history.

(56) References Cited

U.S. PATENT DOCUMENTS

| 2020/0039297 | A1  | 2/2020 | Takano |
|---|---|---|---|
| 2021/0086561 | A1* | 3/2021 | Yoshida .................. B60C 11/01 |
| 2021/0178825 | A1* | 6/2021 | Sato ........................ B60C 11/01 |
| 2022/0118796 | A1* | 4/2022 | Sakamoto ............... B60C 11/11 |

FOREIGN PATENT DOCUMENTS

JP 2020-19429 A 2/2020

* cited by examiner

*Primary Examiner* — Katelyn W Smith
*Assistant Examiner* — Nicholas J Weiler
(74) *Attorney, Agent, or Firm* — Birch, Stewart, Kolasch & Birch, LLP (57) ABSTRACT

A pneumatic tire includes a tread portion having a first tread edge and a first buttress portion extending inward in a tire radial direction from the first tread edge. The first buttress portion has a plurality of stepped surfaces protruding outward in a tire axial direction. At least one of the stepped surfaces is a first stepped surface including a plurality of stepped portions having different protruding heights in the tire axial direction at the same height position in the tire radial direction.

19 Claims, 6 Drawing Sheets

PNEUMATIC TIRE

RELATED APPLICATIONS

This application claims the benefit of foreign priority to Japanese Patent Applications No. JP2022-023104, filed Feb. 17, 2022, which are incorporated by reference in its entirety.

FIELD OF THE INVENTION

The present disclosure relates to a pneumatic tire.

BACKGROUND OF THE INVENTION

Japanese Unexamined Patent Application Publication No. 2020-19429 has described a pneumatic tire having protrusions protruding outward in a tire axial direction from an outer surface of a shoulder land region. The protrusions include first protrusions extending in a tire radial direction and second protrusions each connecting radially inner portions of two first protrusions adjacent to each other. This pneumatic tire is said to increase traction when driving on snow.

SUMMARY OF THE INVENTION

In recent years, there has been a demand for improvement not only in on-snow performance and mud performance but also in durability performance for such pneumatic tires.

The present disclosure was made in view of the above, and a primary object thereof is to provide a pneumatic tire capable of improving the on-snow performance, the mud performance, and the durability performance.

The present disclosure is a pneumatic tire including a tread portion having a first tread edge, and a first buttress portion extending inward in a tire radial direction from the first tread edge, wherein
  the first buttress portion has a plurality of stepped surfaces protruding outward in a tire axial direction, and
  at least one of the stepped surfaces is a first stepped surface including a plurality of stepped portions having different protruding heights in the tire axial direction at the same height position in the tire radial direction.

The tire of the present disclosure can improve the on-snow performance, the mud performance, and the durability performance by adopting the above configuration.

DETAILED DESCRIPTION OF THE INVENTION

An embodiment of the present disclosure will now be described below in conjunction with accompanying drawings.

Figure 1:
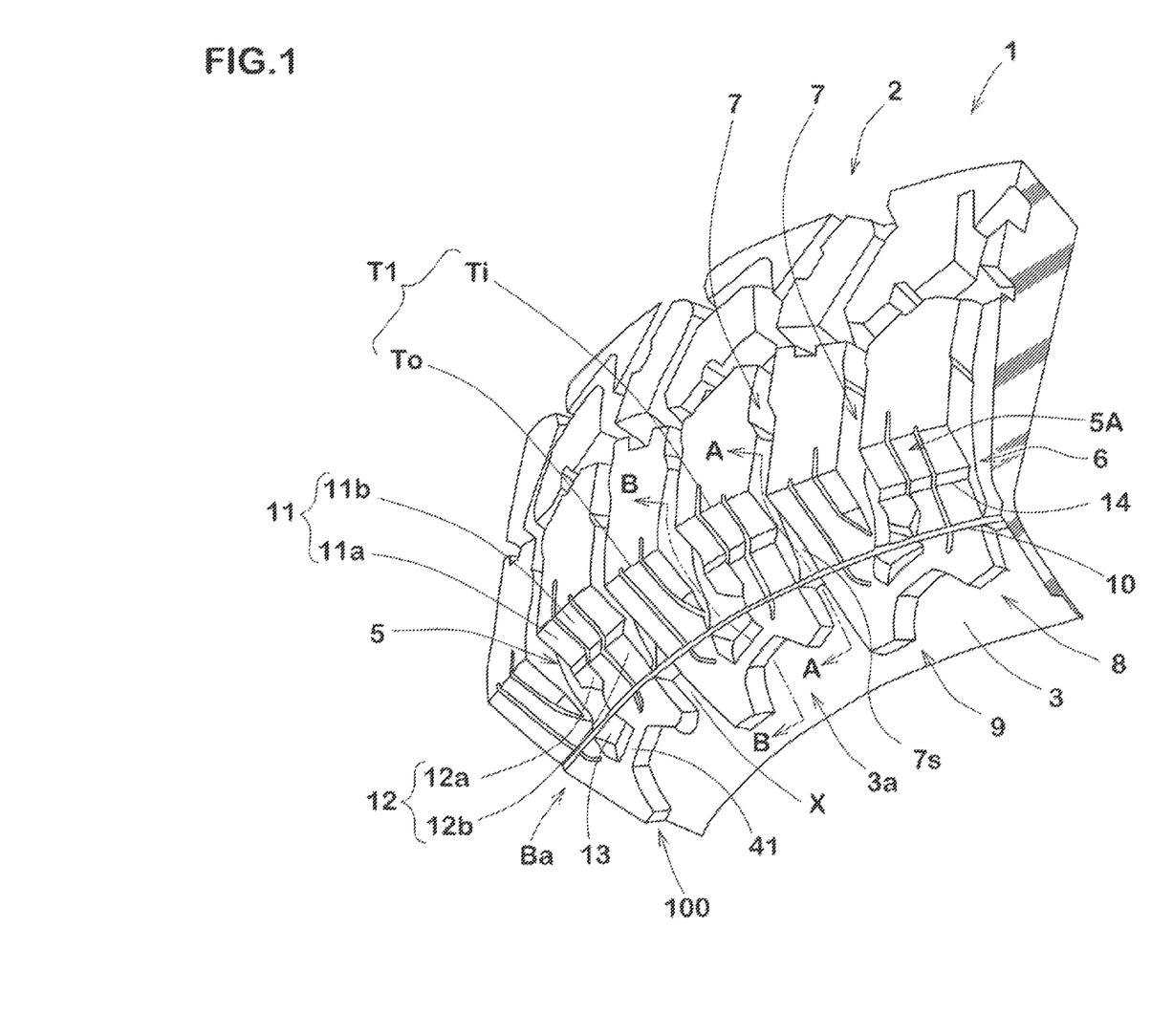
FIG. 1 is a perspective cross-sectional view showing a pneumatic tire according to an embodiment of the present disclosure.
Figure 2:
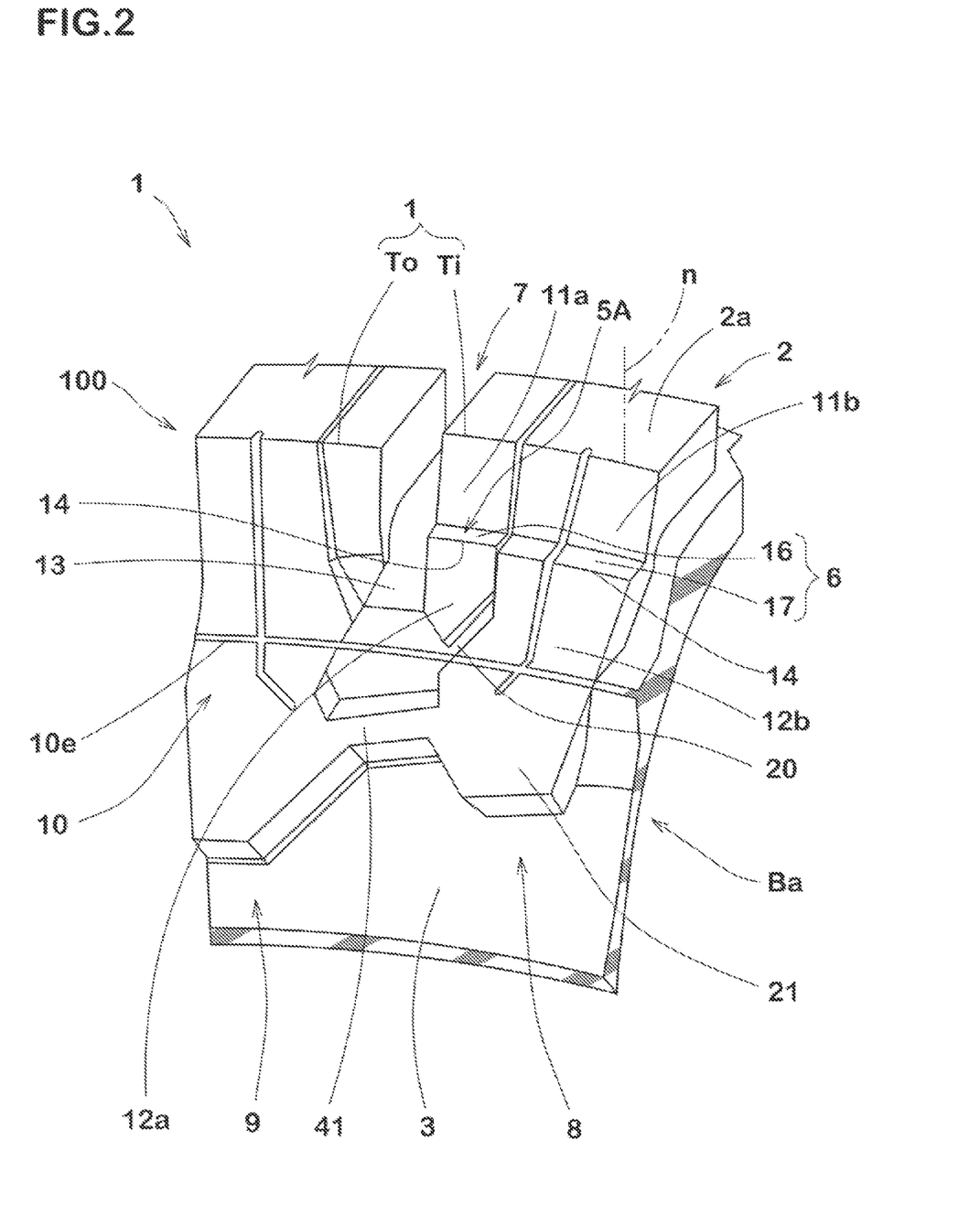
FIG. 2 is an enlarged perspective cross-sectional view of the pneumatic tire of FIG. 1.

FIG. 1 is a perspective cross-sectional view of a pneumatic tire 1 (hereinafter, may be simply referred to as "tire 1") according to the present embodiment. FIG. 2 is a perspective cross-sectional view of the tire 1, further enlarged from FIG. 1. As a preferred embodiment, FIGS. 1 and 2 show the tire 1 configured to be mounted on a 4WD-car or the like, which is capable of running on rough terrain such as muddy ground and snowy road surfaces. However, the present disclosure can also be applied to tires including tires for light trucks and heavy-duty tires. FIGS. 1 and 2 show the tire 1 in a standard state.

The term "standard state" refers to a state in which the tire 1 is mounted on a standard rim (not shown), inflated to a standard inner pressure, and loaded with no tire load. In the present specification, unless otherwise specified, dimensions of various parts of the tire 1 are values measured in the standard state.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

Tire components such as a carcass (Ca) and a belt layer (Be) (shown in FIGS. 3 and 5) are arranged inside the tire 1 of the present embodiment. These tire components can be made appropriately in any known manner.

In the present embodiment, the tire 1 includes a tread portion 2 having a first tread edge T1 and a first buttress portion (Ba) extending inward in a tire radial direction from the first tread edge T1. The tire 1 includes a sidewall portion 3 extending radially inward from the first buttress portion (Ba), for example.

The tire 1 further includes, for example, a second tread edge located on the opposite side in a tire axial direction from the first tread edge T1, and a second buttress portion (not shown) extending radially inward from the second tread edge. In the tire 1 of the present embodiment, the first buttress portion (Ba) and the second buttress portion are formed in the same manner. Therefore, the description of the second buttress portion is omitted in the present specification. It should be noted that the second buttress portion may be configured differently from the first buttress portion (Ba).

The first tread edge T1 and the second tread edge are defined as the axially outermost ground contacting positions when the tire 1 in the standard state is in contact with a flat surface with zero camber angle by being loaded with a standard tire load.

The term "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The first buttress portion (Ba) in the present embodiment has a plurality of stepped surfaces 5 protruding outward in the tire axial direction. At least one (multiple in the present embodiment) of the stepped surfaces 5 is a first stepped surface 5A including a plurality of stepped portions 6 having different protruding heights in the tire axial direction at the same height position in the tire radial direction. The stepped portions 6 configured as such have large edge components and increase the scratched amount of mud and snow to increase shearing force thereof. In addition, the stepped portions 6 suppress clogging of mud and snow. Therefore, the on-snow performance and the mud performance are improved. Further, the stepped portions 6 increase the heat dissipation area and suppress the temperature rise of the first buttress portion (Ba), thereby, the durability performance is improved. Therefore, the tire 1 of the present disclosure can improve the on-snow performance, the mud performance, and the durability performance.

The first tread edge T1 includes an outer tread edge (To) and an inner tread edge (Ti) located axially inside the outer tread edge (To). The Tire 1 having the first tread edge T1 configured as such increases the scratch amount of mud, snow, and the like at the inner tread edge (Ti), thereby, traction performance is improved.

The tread portion 2 includes shoulder lateral grooves 7 extending in the tire axial direction and opening at the first buttress portion (Ba). The shoulder lateral grooves 7 are arranged in a tire circumferential direction, for example. Each of the shoulder lateral grooves 7 extends to cross the first tread edge T1 in the present embodiment.

The first buttress portion (Ba) is provided with a reference surface (X) smoothly connecting groove bottoms (7s) of the shoulder lateral grooves 7 and an outer surface (3a) of the sidewall portion 3. Further, the first buttress portion (Ba) is provided with a circumferential protrusion 10 extending in the tire circumferential direction and protruding axially outward from the reference surface (X), for example. The circumferential protrusion 10 has an outer surface (10e) located axially outside and radially inside the first stepped surface 5A, for example. In the present embodiment, the circumferential protrusion 10 is formed in an annular shape extending continuously in the tire circumferential direction. The circumferential protrusion 10 configured as such prevents the tire 1 from sinking deep into the muddy ground to enhance the mud performance and the on-snow performance.

The first buttress portion (Ba) includes first side portions 8 and second side portions 9. Each of the first side portions 8 is adjacent to a respective one of the second side portions 9 via a respective one of the shoulder lateral grooves 7. One first side portion 8, one second side portion 9 adjacent there to, and one shoulder lateral groove arranged therebetween forms a protrusion element 100 and multiple protrusion elements 100 are arranged in the tire circumferential direction so that the first side portions 8 and the second side portions 9 are arranged alternately in the tire circumferential direction, for example. In each of the protrusion elements 100, the shoulder lateral groove 7 and a recessed portion 13 continuous with the shoulder lateral groove 7 are arranged between the first side portion 8 and the second side portion 9.

Figure 3:
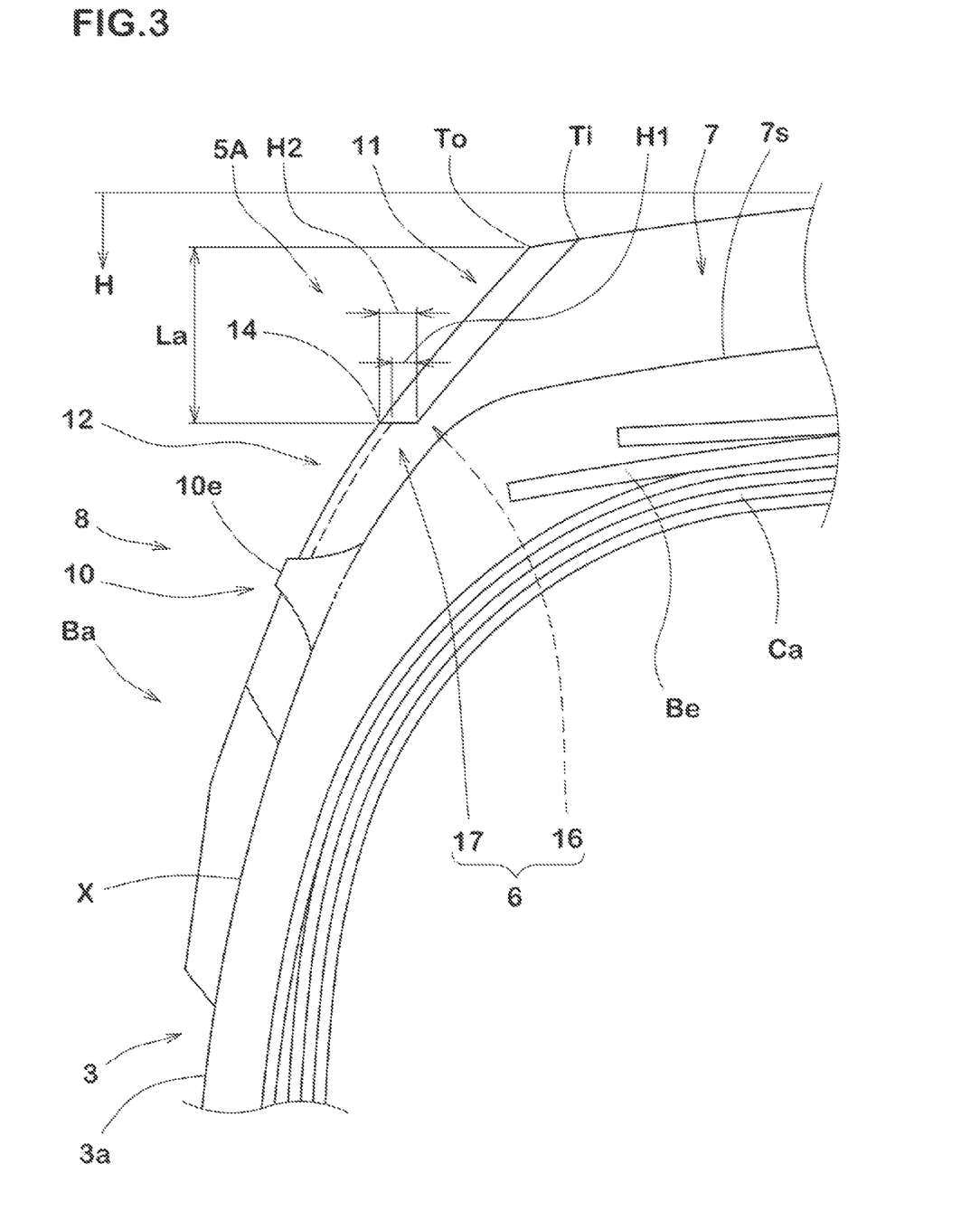
FIG. 3 is a tire meridian section of the pneumatic tire taken along A-A line of FIG. 1.

FIG. 3 is a tire meridian section taken along A-A line of FIG. 1. As shown in FIGS. 1-3, each of the first side portions 8 in the present embodiment is provided with the first stepped surface 5A. The first stepped surface 5A is located axially outside the reference surface (X), for example. Therefore, shearing force can be applied to the mud and snow between the first stepped surface 5A and the reference surface (X).

Each of the first side portions 8 includes first side surfaces 11, second side surfaces 12 and the stepped surfaces 5 in the present embodiment. The first side surfaces 11 are the surfaces facing outward in the tire axial direction. The first side surfaces 11 extend inward in the tire radial direction from the inner tread edge (Ti) in the present embodiment. The second side surfaces 12 are located radially inside the first side surfaces 11 and face outward in the tire axial direction. The second side surfaces 12 are located axially outside the first side surfaces 11 in the present embodiment. The stepped surfaces 5 (the first stepped surfaces 5A in the present embodiment) connect the first side surfaces 11 and the second side surfaces 12.

The stepped surfaces 5 include intersecting edges 14 intersecting the second side surfaces 12. The intersecting edges 14 extend along the tire circumferential direction. The intersecting edges 14 configured as such help to improve the traction performance by increasing the ability to scratch mud and snow. The intersecting edges 14 extend parallel to the tire circumferential direction in the present embodiment.

It is preferred that a distance (La) in the tire radial direction between the first stepped surfaces 5A and the inner tread edge (Ti) is from 3% to 30% of a tire section height (H). The tire section height (H) is well known and is a length in the tire radial direction between a bead baseline (not shown) and a radially outer end of the tire 1.

Each of the stepped portions 6 include a first stepped portion 16 and a second stepped portion 17 adjacent to the first stepped portion 16 in the tire circumferential direction and having a larger protruding height than the first stepped portion 16. The stepped portions 6 may include, for example, third stepped portions (not shown) having a larger protruding height than the second stepped portions 17, or fourth stepped portions (not shown) having a larger protruding height than the third stepped portions. The stepped portions 6 of the present embodiment are formed by the first stepped portions 16 and the second stepped portions 17.

In each of the protrusion elements 100, the first stepped portion 16 is located closer to the shoulder lateral groove 7 than the second stepped portion 17 in the tire circumferential direction. Thereby, it is possible that mud and snow in the shoulder lateral groove 7 and the recessed portion 13 are removed smoothly. In addition, by specifying the rotational direction of the tire 1, the first stepped portion 16 and the second stepped portion 17 can sequentially exert shearing force against mud and snow in the shoulder lateral groove 7 and the recessed portion 13, therefore, the mud performance and the on-snow performance are further improved.

In order to effectively exert such action, a protruding height H1 of the first stepped portion 16 is preferably 35% or more, more preferably 40% or more, and preferably, more preferably 70% or less of a protruding height H2 of the second stepped portion 17. Each of the protruding heights H1 and H2 is the length in the tire axial direction in the present specification.

The first side surfaces 11 include first outer side surface portions (11a) continuously connected with the first stepped portions 16 and second outer side surface portions (11b) continuously connected to the second stepped portions 17. Each of the first outer side surface portions (11a) and the second outer side surface portions (11b) is, for example, inclined at the same angle with respect to a normal line (n) of a ground contacting surface (2a) of the tread portion 2 passing through the inner tread edge (Ti). The first side surfaces 11 configured as such can strongly compact mud and snow.

The second side surfaces 12 are located axially outside the reference surface (X) in the present embodiment. The second side surfaces 12 include, for example, first inner side surface portions (12a) continuously connected to the first stepped portions 16 and second inner side surface portions (12b) continuously connected with the second stepped portion 17. The first inner side surface portions (12a) terminate radially outside the second inner side surface portions (12b), for example.

Each of the first side portions 8 of the first buttress portion (Ba) is provided with a longitudinal sipe 20 (hereinafter may be referred to first longitudinal sipe 20) extending in the tire radial direction between the first stepped portion 16 and the second stepped portion 17. The first longitudinal sipe 20 extends along the first outer side surface portion (11a), the first inner side surface portion (12a), and the first stepped portion 16 in the present embodiment. Therefore, the first side portions 8 have large edge components. In addition, the first longitudinal sipes 20 moderately deform the first side portions 8 when the tire touches the ground, giving vibrations to the mud and snow in the shoulder lateral grooves 7 and the recessed portion 13, thereby, it is possible that the mud and the snow are discharged smoothly. Therefore, the mud performance and the on-snow performance are further improved. In the present specification, a sipe including the longitudinal sipe 20 and a first sipe and a second sipe to be described later refers to an incision with a width of 1.5 mm or less, and is distinguished from a groove with a groove width larger than 1.5 mm.

Figure 4:
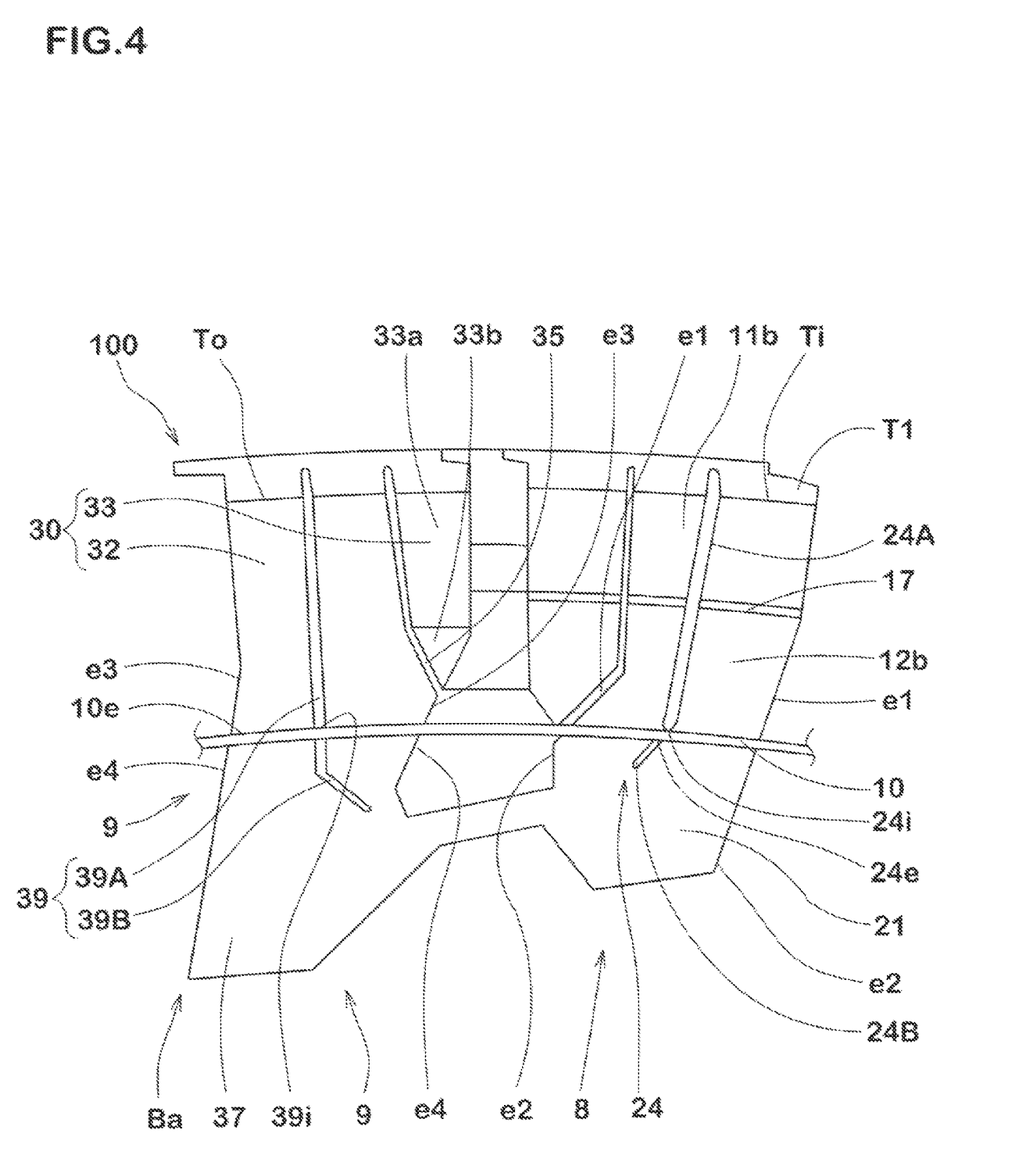
FIG. 4 is a front view of a first buttress portion.

FIG. 4 is a front view of the first buttress portion (Ba) viewed from the front. As shown in FIG. 4, each of the first side portions 8 includes a third side surface 21 extending radially inward from the circumferential protrusion 10, for example. The third side surface 21 in the present embodiment faces outward in the tire axial direction and is positioned axially outside the reference surface (X). The third side surface 21 is smoothly connected with the second inner side surface portion (12b), for example. In the present specification, the term "smoothly connected" means that, in the front view of the first buttress portion (Ba), edges (e1) on both sides in the tire circumferential direction of the second inner side surface portion (12b) and edges (e2) on both sides in the tire circumferential direction of the third side surface 21 form one imaginary line on each side in the tire circumferential direction. The imaginary line includes a straight line and a curved line.

Each of the first side portions 8 includes a first sipe 24 extending radially inward from the first tread edge T1 (the inner tread edge (Ti) in the present embodiment) through the second stepped portion 17. The first sipes 24 configured as such further increase the edge components and the heat dissipation area of the first side portions 8, therefore, the mud performance, the on-snow performance, and the durability performance are improved.

The first sipe 24 terminates to have a closed end within the first side portion 8. As a result, an excessive decrease in rigidity of the first side portion 8 is suppressed, therefore, the durability performance is maintained at a high level. The first sipe 24 in the present embodiment includes an outer first sipe portion 24A extending in the second outer side surface portion (11b) and the second inner side surface portion (12b) and an inner first sipe portion 24B extending in the third side surface 21. The outer first sipe portion 24A has an inner end (24i) in the tire radial direction terminating without connected to the outer surface (10e) of the circumferential protrusion 10, for example. In the present embodiment, the inner first sipe portion 24B has an outer end (24e) at the same position in the tire circumferential direction as the inner end (24i) and radially inside the outer surface (10e). The inner first sipe portion 24B terminates to have a closed end within the third side surface 21, for example.

Each of the second side portions 9 is free of the stepped surfaces 5 or provided with a second stepped surface (not shown) having a different step shape from the first stepped surface 5A, for example. The second side portions 9 of the present embodiment are not provided with the stepped surfaces 5. If each of the second side portions 9 has the second stepped portion, it is preferred that each of the second side portions 9 has one or two stepped portions 6, for example.

Figure 5:
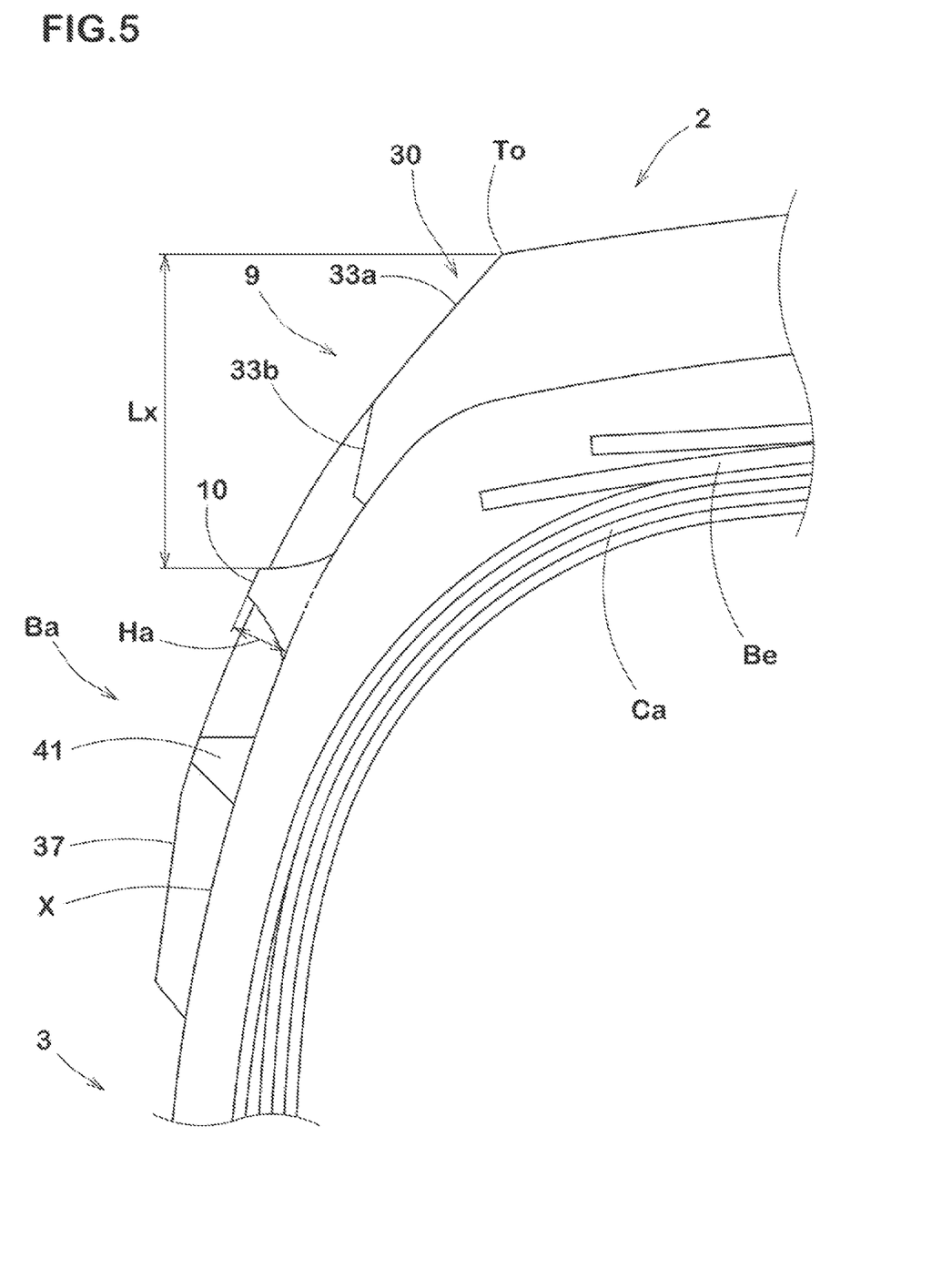
FIG. 5 is a tire meridian section of the pneumatic tire taken along B-B line of FIG. 1.

FIG. 5 is a tore meridian section taken along B-B line of FIG. 1. As shown in FIGS. 4 and 5, each of the second side portions 9 is connected with the outer tread edge (To). Each of the first side portions 8 is connected with the inner tread edge (Ti). Each of the second side portions 9 includes a fourth side surface 30 extending from the outer tread edge (To) and facing outward in the tire axial direction. The fourth side surface 30 includes a side surface main portion 32 extending to the circumferential protrusion 10 and a side surface sub portion 33 adjacent to the side surface main portion 32 in the tire circumferential direction and having a length in the tire circumferential direction smaller than the side surface main portion 32. The side surface sub portion 33 includes an outer portion (33a) extending from the outer tread edge (To) and an inner portion (33b) inclined axially inward from the outer portion (33a) as it goes radially inward. The boundary between the outer portion (33a) and the inner portion (33b) is located at the same height position in the tire radial direction as the first stepped surface 5A, for example.

Each OF the second side portions 9 is provided with a second longitudinal sipe 35 extending in the tire radial direction between the side surface main portion 32 and the side surface sub portion 33, for example. The second longitudinal sipe 35 configured as such exerts the same effect as the first longitudinal sipe 20. The second longitudinal sipe 35 extends from the outer tread edge (To) to an inner end in the tire radial direction of the inner portion (33b).

Each of the second side portions 9 in the present embodiment further includes a fifth side surface 37 extending radially inward from the circumferential protrusion 10. The fifth side surface 37 in the present embodiment faces outward in the tire axial direction and is located axially outside the reference surface (X). The fifth side surface 37 is smoothly connected with the side surface main portion 32, for example. In the present specification, the term "smoothly connected" means that edges e3 on both sides in the tire circumferential direction of the side surface main portion 32 and edges e4 on both sides in the tire circumferential direction of the fifth side surface 37 form one imaginary line (including a straight line and a curved line) on each side in the tire circumferential direction.

Each of the second side portions 9 further includes, for example, a second sipe 39 extending radially inward from the first tread edge T1 (the outer tread edge (To) in the present embodiment). The second sipes 39 configured as such increase the edge components and the heat dissipation area of the second side portions 9, therefore, the mud performance, the on-snow performance, and the durability performance are improved.

The second sipe 39 terminates to have a closed end within the second side portion 9. As a result, an excessive decrease in the rigidity of the second side portion 9 is suppressed, thereby, the durability performance is maintained high. The second sipe 39 in the present embodiment includes an outer second sipe portion 39A extending in the side surface main portion 32 and an inner second sipe portion 39B extending in the fifth side surface 37. The outer second sipe portion 39A has an inner end (39i) in the tire radial direction terminating without connected to the outer surface (10e) of the circumferential protrusion 10. The inner second sipe portion 39B has an outer end located at the same position in the tire circumferential direction as the inner end (39i) and radially inside the outer surface (10e). The inner second sipe portion 39B terminates to have a closed end within the fifth side surface 37, for example.

Figure 6:
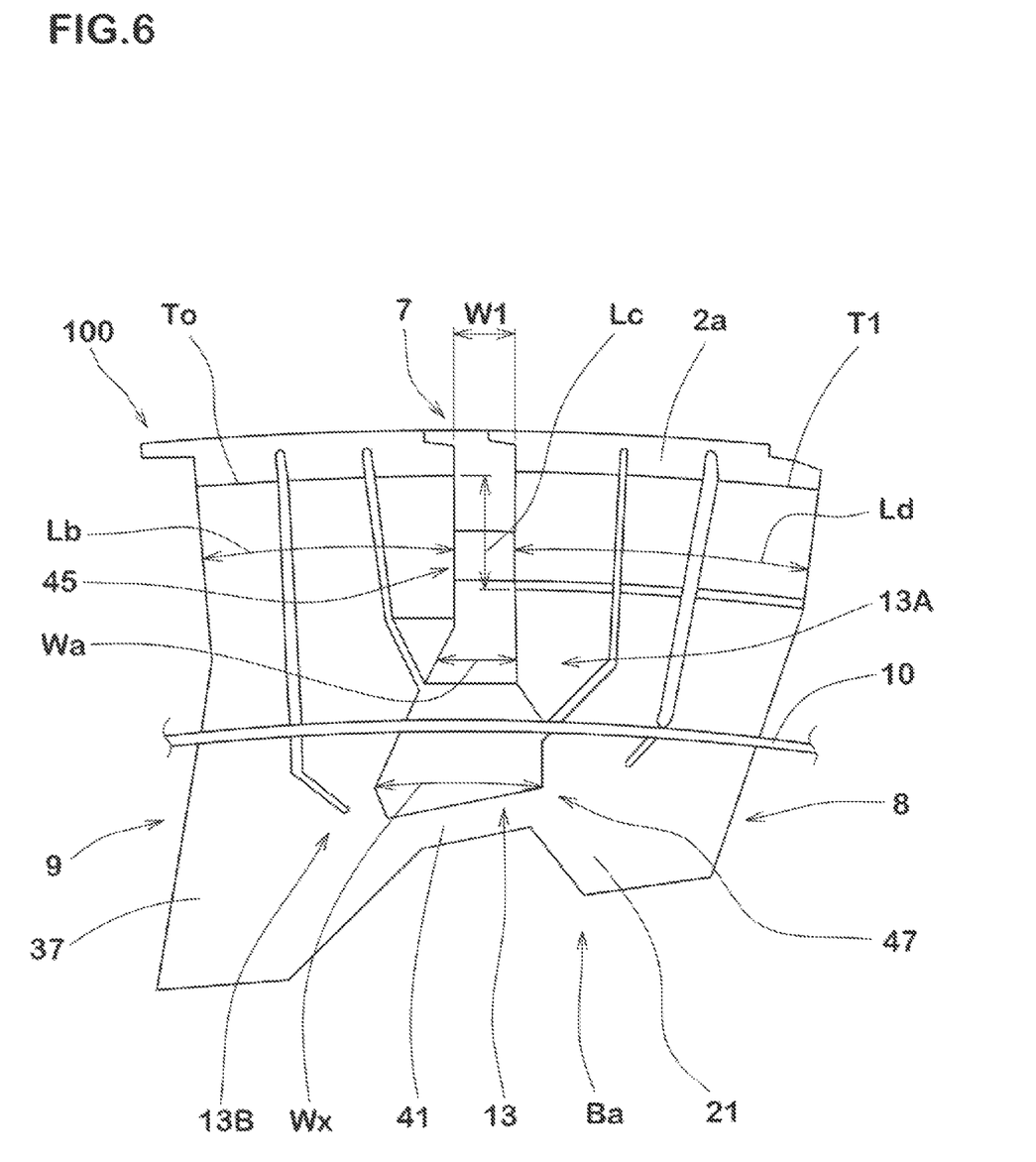
FIG. 6 is a front view of the first buttress portion.

FIG. 6 is a front view of the first buttress portion (Ba) viewed from the front. As shown in FIG. 6, the first buttress portion (Ba) (i.e., each of the protrusion elements 100 in this case) includes a raised portion 41 connecting the first side portion 8 and the second side portion 9. The raised portion 41 configured as such suppresses excessive deformation of the first side portion 8 and the second side portion 9 and helps to maintain the durability performance high. The raised portion 41 connects the third side surface 21 and the fifth side surface 37, for example. The raised portion 41 has the same protruding height in the tire axial direction as the third side surface 21 and the fifth side surface 37, for example. In other words, the third side surface 21 and the fifth side surface 37 are smoothly connected via the raised portion 41.

Each of the first side portion 8 and the second side portion 9 extends further radially inward than the raised portion 41. That is to say, the third side surface 21 and the fifth side surface 37 extend further radially inward than the raised portion 41. Since the first side portions 8 and the second side portions 9 configured as such have large edge components, the mud performance and the on-snow performance are improved.

The recessed portion 13 has a reduced portion 45, where a width (Wa) in the tire circumferential direction of the recessed portion 13 is minimum, positioned radially outside an inner end in the tire radial direction of the recessed portion 13, for example. As a result, mud and snow that come in from the ground contacting surface (2a) are further packed by the reduced portion 45, therefore, the shearing force against mud and snow is further increased. It is preferred that a distance (Lc) in the tire radial direction between the reduced portion 45 and the outer tread edge (To) is from 3% to 30% of the tire section height (H). The reduced portion 45 in the present embodiment is formed between the first inner side surface portions (12a) and the outer portion (33a) and radially inside the groove bottom (7s) of the shoulder lateral groove 7 in each of the protrusion elements 100.

The recessed portion 13 in the present embodiment includes an outer recessed portion 13A located radially outside the circumferential protrusion 10 and an inner recessed portion 13B located radially inside the circumferential protrusion 10. Further, the outer recessed portion 13A in the present embodiment has a gradually decreasing portion in which the width (Wa) in the tire circumferential direction continuously decreases radially outward from the circumferential protrusion 10. The outer recessed portion 13A includes the reduced portion 45, for example. The inner recessed portion 13B has an enlarged portion 47 in which the width (Wa) in the tire circumferential direction is maximum.

In order to increase the rigidity of the first buttress portion (Ba) and the shearing force against mud and snow in the recessed portion 13 in a good balance, a width (Wx) in the tire circumferential direction of the enlarged portion 47 is preferably 1.5 times or more a groove width W1 of the shoulder lateral grooves 7, more preferably 1.7 times or more, and preferably 3.0 times or less, more preferably 2.7 times or less the groove width W1.

It is preferred that a length (Ld) in the tire circumferential direction of each of the first side portions 8 is from 90% to 110% of a length (Lb) in the tire circumferential direction of each of the second side portions 9. This reduces the difference in the rigidity between the first side portions 8 and the second side portions 9, therefore, the durability performance of the tire 1 is improved. In addition, the same shearing force is exerted regardless of the rotational direction of the tire 1. The length (Ld) of each of the first side portions 8 and the length (Lb) of each of the second side portions 9 are the lengths at the same height position in the tire radial direction as the first tread edge T1.

It is preferred that each of the shoulder lateral grooves 7 has the groove width W1 of 50 mm or less, for example. In other words, it is preferred that the interval in the tire circumferential direction between the first side portion 8 and the second side portion 9 is 50 mm or less in each of the protrusion elements 100. Thereby, the traction performance is maintained high. The groove width W1 of each of the shoulder lateral grooves 7 is preferably 35 mm or more, more preferably 40 mm or more, and further preferably 45 mm or less.

As shown in FIG. 5, the circumferential protrusion 10 is formed so as to taper outward in the tire axial direction, for example. It is preferred that a protruding height (Ha) of the circumferential protrusion 10 from the reference surface (X) is from 1 to 10 mm, for example. The circumferential protrusion 10 configured as such is formed at a contact portion between a tread mold and a side plate (not shown) of a known vulcanization mold for forming the tire 1, for example. Further, a distance (Lx) in the tire circumferential direction between the outer tread edge (To) and the circumferential protrusion 10 is from 1% to 40% of the tire section height (H). It should be noted that the circumferential protrusion 10 may not be formed in the tire 1.

While detailed description has been made of an especially preferred embodiment of the present disclosure, the present disclosure can be embodied in various forms without being limited to the illustrated embodiment.

[Statement of Disclosure]

The present disclosure includes the following aspects.

[Present Disclosure 1]

A pneumatic tire including a tread portion having a first tread edge, and a first buttress portion extending inward in a tire radial direction from the first tread edge, wherein
  the first buttress portion has a plurality of stepped surfaces protruding outward in a tire axial direction, and
  at least one of the stepped surfaces is a first stepped surface including a plurality of stepped portions having different protruding heights in the tire axial direction at the same height position in the tire radial direction.

[Present Disclosure 2]

The pneumatic tire according to Present Disclosure 1, wherein
  the first buttress portion includes a first side surface facing outward in the tire axial direction and a second side surface located radially inside the first side surface and facing outward in the tire axial direction, and
  at least one of the stepped surfaces directly connects the first side surface and the second side surface.

[Present Disclosure 3]

The pneumatic tire according to Present Disclosure 2, wherein
  the at least one of the stepped surfaces includes an intersecting edge intersecting the second side surface, and the intersecting edge extends along the tire circumferential direction.

[Present Disclosure 4]

The pneumatic tire according to any one of Present Disclosures 1 to 3, wherein the stepped portions include a first stepped portion and a second stepped portion adjacent to the first stepped portion in the tire circumferential direction and having a protruding height larger than a protruding height of the first stepped portion.

[Present Disclosure 5]

The pneumatic tire according to Present Disclosure 4, wherein the first buttress portion is provided with a longitudinal sipe extending in the tire radial direction between the first stepped portion and the second stepped portion.

[Present Disclosure 6]

The pneumatic tire according to any one of Present Disclosures 1 to 5, wherein
the tread portion includes a shoulder lateral groove extending in the tire axial direction and opening at the first buttress portion,
the first buttress portion includes a first side portion and a second side portion adjacent to each other with the shoulder lateral groove therebetween,
the first side portion is provided with the first stepped surface, and
the second side portion is free of the stepped surfaces or provided with a second stepped surface having a step shape different from the first stepped surface.

[Present Disclosure 7]

The pneumatic tire according to Present Disclosure 6, wherein
the first tread edge includes an outer tread edge and an inner tread edge located axially inside the outer tread edge,
the first side portion is connected with the inner tread edge, and
the second side portion is connected with the outer tread edge.

[Present Disclosure 8]

The pneumatic tire according to Present Disclosure 6 or 7, wherein
the stepped portions include a first stepped portion and a second stepped portion having a protruding height larger than the first stepped portion, and
the first stepped portion is located closer to the shoulder lateral groove than the second stepped portion.

[Present Disclosure 9]

The pneumatic tire according to Present Disclosure 8, wherein
the stepped portions include a first stepped portion and a second stepped portion adjacent to the first stepped portion in the tire circumferential direction and having a protruding height larger than the first stepped portion,
the first side portion includes a first sipe extending radially inward from the first tread edge through the second stepped portion, and
the second side portion includes a second sipe extending radially inward from the first tread edge.

[Present Disclosure 10]

The pneumatic tire according to Present Disclosure 9, wherein
the first sipe terminates within the first side portion, and
the second sipe terminates within the second side portion.

[Present Disclosure 11]

The pneumatic tire according to any one of Present Disclosures 6 to 10, wherein the first buttress portion includes a raised portion connecting the first side portion and the second side portion.

[Present Disclosure 12]

The pneumatic tire according to Present Disclosure 11, wherein each of the first side portion and the second side portion extends radially further inward than the raised portion.

[Present Disclosure 13]

The pneumatic tire according to any one of Present Disclosures 6 to 12, wherein
a recessed portion continuous with the shoulder lateral groove is arranged between the first side portion and the second side portion,
the recessed portion has a reduced portion positioned radially outside an inner end in the tire radial direction of the recessed portion, and
the reduced portion is a portion where a width in the tire circumferential direction of the recessed portion is minimum.

DESCRIPTION OF REFERENCE SIGNS 1 pneumatic tire
2 tread portion
5 stepped surface
5A first stepped surface
6 stepped portion
Ba first buttress portion
T1 first tread edge

The invention claimed is:

1. A pneumatic tire comprising a tread portion having a first tread edge, and a first buttress portion extending inward in a tire radial direction from the first tread edge, wherein
the first buttress portion has a plurality of stepped surfaces protruding outward in a tire axial direction,
at least one of the stepped surfaces is a first stepped surface including a plurality of stepped portions having different protruding heights in the tire axial direction at the same height position in the tire radial direction,
the tread portion includes a shoulder lateral groove extending in the tire axial direction and opening at the first buttress portion,
the first buttress portion includes a first side portion and a second side portion adjacent to each other with the shoulder lateral groove therebetween,
the first side portion is provided with the first stepped surface,
the second side portion is free of the stepped surfaces or provided with a second stepped surface having a step shape different from the first stepped surface,
the stepped portions include a first stepped portion and a second stepped portion adjacent to the first stepped portion in the tire circumferential direction and having a protruding height larger than the first stepped portion,
the first stepped portion is located closer to the shoulder lateral groove than the second stepped portion,
the first side portion includes a first sipe extending radially inward from the first tread edge through the second stepped portion, and
the second side portion includes a second sipe extending radially inward from the first tread edge.

2. The pneumatic tire according to claim 1, wherein
the first buttress portion includes a first side surface facing outward in the tire axial direction and a second side surface located radially inside the first side surface and facing outward in the tire axial direction, and at least one of the stepped surfaces directly connects the first side surface and the second side surface.

3. The pneumatic tire according to claim 2, wherein the at least one of the stepped surfaces includes an intersecting edge intersecting the second side surface, and the intersecting edge extends along the tire circumferential direction.

4. The pneumatic tire according to claim 2, wherein the second side surface is located axially outside the first side surface.

5. The pneumatic tire according to claim 2, wherein the stepped portions include a first stepped portion and a second stepped portion adjacent to the first stepped portion in the tire circumferential direction and having a protruding height larger than a protruding height of the first stepped portion, the first side surface includes a first outer side surface portion connected with the first stepped portion and a second outer side surface portion connected to the second stepped portion, the first tread edge includes an outer tread edge and an inner tread edge located axially inside the outer tread edge, and each of the first outer side surface portion and the second outer side surface portion is inclined at the same angle with respect to a normal line of a ground contacting surface of the tread portion passing through the inner tread edge.

6. The pneumatic tire according to claim 1, wherein the stepped portions include a first stepped portion and a second stepped portion adjacent to the first stepped portion in the tire circumferential direction and having a protruding height larger than a protruding height of the first stepped portion.

7. The pneumatic tire according to claim 6, wherein the first buttress portion is provided with a longitudinal sipe extending in the tire radial direction between the first stepped portion and the second stepped portion.

8. The pneumatic tire according to claim 7, wherein the first buttress portion includes a first side surface facing outward in the tire axial direction and a second side surface located radially inside the first side surface and facing outward in the tire axial direction, the first side surface includes a first outer side surface portion connected with the first stepped portion and a second outer side surface portion connected to the second stepped portion, the second side surface includes a first inner side surface portion connected to the first stepped portion and a second inner side surface portion connected with the second stepped portion, and the first longitudinal sipe extends along the first outer side surface portion, the first inner side surface portion, and the first stepped portion.

9. The pneumatic tire according to claim 6, wherein the protruding height of the first stepped portion is 35% or more and 75% or less of the protruding height of the second stepped portion.

10. The pneumatic tire according to claim 1, wherein the first tread edge includes an outer tread edge and an inner tread edge located axially inside the outer tread edge, the first side portion is connected with the inner tread edge, and the second side portion is connected with the outer tread edge.

11. The pneumatic tire according to claim 10, wherein a distance (La) in the tire radial direction between the first stepped surface and the inner tread edge is from 3% to 30% of a tire section height (H).

12. The pneumatic tire according to claim 10 further comprising a sidewall portion, wherein the first buttress portion is provided with a reference surface and a circumferential protrusion, the reference surface smoothly connects a groove bottom of the shoulder lateral groove and an outer surface of the sidewall portion, the circumferential protrusion extends in the tire circumferential direction and protrudes axially outward from the reference surface, the second side portion includes a fourth side surface extending from the outer tread edge and facing outward in the tire axial direction, the fourth side surface includes a side surface main portion and a side surface sub portion, the side surface main portion extends to the circumferential protrusion, the side surface sub portion is adjacent to the side surface main portion in the tire circumferential direction and has a length in the tire circumferential direction smaller than the side surface main portion, and the side surface sub portion includes an outer portion extending from the outer tread edge and an inner portion inclined axially inward from the outer portion as it goes radially inward.

13. The pneumatic tire according to claim 1, wherein the first sipe terminates within the first side portion, and the second sipe terminates within the second side portion.

14. The pneumatic tire according to claim 1, wherein the first buttress portion includes a raised portion connecting the first side portion and the second side portion.

15. The pneumatic tire according to claim 14, wherein each of the first side portion and the second side portion extends radially further inward than the raised portion.

16. The pneumatic tire according to claim 1, wherein a recessed portion continuous with the shoulder lateral groove is arranged between the first side portion and the second side portion, the recessed portion has a reduced portion positioned radially outside an inner end in the tire radial direction of the recessed portion, and the reduced portion is a portion where a width in the tire circumferential direction of the recessed portion is minimum.

17. The pneumatic tire according to claim 16 further comprising a sidewall portion, wherein the first buttress portion is provided with a reference surface and a circumferential protrusion, the reference surface smoothly connects a groove bottom of the shoulder lateral groove and an outer surface of the sidewall portion, the circumferential protrusion extends in the tire circumferential direction and protrudes axially outward from the reference surface, the recessed portion includes an outer recessed portion located radially outside the circumferential protrusion and an inner recessed portion located radially inside the circumferential protrusion, the outer recessed portion has the reduced portion and a gradually decreasing portion in which a width (Wa) in the tire circumferential direction of the recessed portion continuously decreases radially outward from the circumferential protrusion, and the inner recessed portion has an enlarged portion in which the width (Wa) is maximum.

18. A pneumatic tire comprising a tread portion having a first tread edge, and a first buttress portion extending inward in a tire radial direction from the first tread edge, wherein
the first buttress portion has a plurality of stepped surfaces protruding outward in a tire axial direction,
at least one of the stepped surfaces is a first stepped surface including a plurality of stepped portions having different protruding heights in the tire axial direction at the same height position in the tire radial direction,
the first buttress portion includes a first side surface facing outward in the tire axial direction and a second side surface located radially inside the first side surface and facing outward in the tire axial direction,
at least one of the stepped surfaces directly connects the first side surface and the second side surface,
the stepped portions include a first stepped portion and a second stepped portion adjacent to the first stepped portion in the tire circumferential direction and having a protruding height larger than a protruding height of the first stepped portion,
the first side surface includes a first outer side surface portion connected with the first stepped portion and a second outer side surface portion connected to the second stepped portion,
the first tread edge includes an outer tread edge and an inner tread edge located axially inside the outer tread edge, and
each of the first outer side surface portion and the second outer side surface portion is inclined at the same angle with respect to a normal line of a ground contacting surface of the tread portion passing through the inner tread edge.

19. A pneumatic tire comprising a tread portion having a first tread edge, and a first buttress portion extending inward in a tire radial direction from the first tread edge, wherein
the first buttress portion has a plurality of stepped surfaces protruding outward in a tire axial direction,
at least one of the stepped surfaces is a first stepped surface including a plurality of stepped portions having different protruding heights in the tire axial direction at the same height position in the tire radial direction,
the stepped portions include a first stepped portion and a second stepped portion adjacent to the first stepped portion in the tire circumferential direction and having a protruding height larger than a protruding height of the first stepped portion,
the first buttress portion is provided with a longitudinal sipe extending in the tire radial direction between the first stepped portion and the second stepped portion,
the first buttress portion includes a first side surface facing outward in the tire axial direction and a second side surface located radially inside the first side surface and facing outward in the tire axial direction,
the first side surface includes a first outer side surface portion connected with the first stepped portion and a second outer side surface portion connected to the second stepped portion,
the second side surface includes a first inner side surface portion connected to the first stepped portion and a second inner side surface portion connected with the second stepped portion, and
the first longitudinal sipe extends along the first outer side surface portion, the first inner side surface portion, and the first stepped portion.

* * * * *